(12) United States Patent
Tabata et al.

(10) Patent No.: US 7,269,434 B2
(45) Date of Patent: Sep. 11, 2007

(54) WIRELESS COMMUNICATION SYSTEM WITH GROUP REGISTRATION FUNCTION

(75) Inventors: Hajime Tabata, Saitama (JP); Yukio Miyamaru, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 1033 days.

(21) Appl. No.: 09/955,198

(22) Filed: Sep. 19, 2001

(65) Prior Publication Data

US 2002/0044535 A1    Apr. 18, 2002

(30) Foreign Application Priority Data

Sep. 19, 2000    (JP)    ............... 2000-283165

(51) Int. Cl.
  *H04Q 7/20*    (2006.01)
  *H04M 3/42*    (2006.01)

(52) U.S. Cl. ............ 455/519; 455/521; 455/416

(58) Field of Classification Search ........... 455/518, 455/519, 463, 464, 465, 426.1, 517, 552.1, 455/521, 416
See application file for complete search history.

(56) References Cited

U.S. PATENT DOCUMENTS

| | | | |
|---|---|---|---|
| 4,649,567 A | | 3/1987 | Childress |
| 4,682,367 A | | 7/1987 | Childress et al. |
| 5,301,357 A | * | 4/1994 | Thompson ............... 455/435.2 |
| 5,335,350 A | * | 8/1994 | Felderman et al. ........... 455/17 |
| 5,495,520 A | * | 2/1996 | Kojima ..................... 455/411 |
| 5,506,837 A | * | 4/1996 | Sollner et al. .............. 370/296 |
| 5,850,611 A | * | 12/1998 | Krebs ........................ 455/518 |
| 5,881,370 A | * | 3/1999 | Pottala et al. ................. 455/78 |
| 6,061,571 A | * | 5/2000 | Tamura ..................... 455/463 |
| 6,138,011 A | * | 10/2000 | Sanders et al. .......... 455/426.1 |
| 6,411,816 B1 | * | 6/2002 | McDonald et al. ......... 455/518 |
| 6,584,324 B1 | * | 6/2003 | Vivekanandan ............ 455/519 |
| 6,876,845 B1 | * | 4/2005 | Tabata et al. .............. 455/344 |
| 7,096,018 B2 | * | 8/2006 | Mikami ................... 455/435.1 |
| 2002/0151320 A1 | * | 10/2002 | Wasenius .................... 455/518 |

FOREIGN PATENT DOCUMENTS

| | | |
|---|---|---|
| DE | 42 33 721 A | 4/1994 |
| DE | 298 17 803 U | 2/1999 |

\* cited by examiner

*Primary Examiner*—Tilahun Gesesse
(74) *Attorney, Agent, or Firm*—Birch, Stewart, Kolasch & Birch, LLP (57) ABSTRACT

A communication system is provided with a group registration function, which is capable of setting a group mode with the reduced number of operation, and simply selecting one of full duplex communication and half duplex communication by a rider, as needed. When a power supply switch and a registration switch are turned on simultaneously, member ID registration is executed. When the power supply switch is turned on and then the registration switch is turned on, visitor ID registration is executed. Accordingly, the registration of a group mode can be simplified. After the registration is ended, at the time of turn-off of a visitor conversation switch, full duplex communication is performed among communication devices subjected to member ID registration, and at the time of turn-on of the visitor conversation switch, half duplex communication is performed between the master and all of the slaves.

19 Claims, 9 Drawing Sheets

WIRELESS COMMUNICATION SYSTEM WITH GROUP REGISTRATION FUNCTION

This nonprovisional application claims priority under 35 U.S.C. § 119(a) on Patent Application No. 2000-283165 filed in Japan on Sep. 19, 2000, which is herein incorporated by reference.

BACKGROUND OF THE INVENTION

1. Field of the Invention

The present invention relates to a communication system with a group registration function, and particularly to a communication system with a group registration function, which is capable of simply registering group members and simply selecting one of full duplex communication, full singlet (broadcast mode) communication, and half duplex communication as needed, and which is suitable for a vehicle such as a motorcycle.

2. Description of the Background Art

When a group of persons enjoy driving or touring by cars or motorcycles, the drivers or riders are, during running, required to consult with each other on where they will rest or which way they will select at a branch road or urgently transmit important communication items to each other. To meet such a requirement, it is very convenient to use communication devices mounted on vehicles. This is because the drivers or riders can consult with each other without temporary stoppage of the vehicles. From this viewpoint, various communication devices mounted on vehicles have been developed.

As one example of conventional communication devices of this type, there is known a communication device which makes communication at the same frequency in the same wave mode, for example, amateur radio transmission or personal radio transmission. Such a communication device, however, has a problem in terms of stealth. This is because when a person transmits a signal to a partner, such a signal is possibly received by a communication device possessed by a person independent of the transmitter. The communication device has another problem in terms of radio interference. This is because when a person receives a signal from a partner, an audio signal transmitted from a person independent of the receiver possibly reaches the receiver.

To solve the above-described problems, a mode called "tone squelch" permitting communication with only a group of partners previously registered, has been generally, widely used. In the case of using this mode, a person in the registered group receives and regenerates only a signal transmitted from a partner in the same registered group, and accordingly, the person in the previously registered group can make communication with only a partner in the same registered group. This makes it possible to keep good stealth, and to solve the problem of obstructing conversation due to radio interference.

Such a mode called "tone squelch", however, has a problem that switches provided on a main body of the communication device must be operated several times (four or five times or more) in order to set the above-described mode. Such mode setting is too complicated to be used for a motorcycle.

In general, the communication type is classified into full duplex communication (two-way communication) and half duplex communication (two-way communication but single-way communication at a time). A rider in a group running by motorcycles often wants to make free two-way conversation with a specific partner (for example, a consort in the group) in the full duplex mode, and to make conversation with the other partners in the half duplex mode, as needed.

The full duplex mode allows two-way conversation just as usual telephone communication only by depressing a conversation switch once. This is convenience for the case where the communicating destination is limited to a specific person as an intercommunication system. On the other hand, in the case where a plurality of motorcycles run together, the use of the half duplex mode or a full singlet mode (broadcasting mode) is convenient. This is because a communication content to be communicated with all the riders can be simultaneously received by all the riders by use of the half duplex or full singlet mode.

The background art communication devices, however, has a problem that it is difficult to change, during communication in the full duplex mode, the communication in the full duplex mode into the communication in another mode, for example, in the full singlet (broadcast) mode or half duplex mode.

As described above, the background art communication device has the problem that since the number of operating switches for setting the mode for permitting communication with only a registered group becomes excessively large, it is cumbersome or difficult to set the mode during running of motorcycles. Another problem of the background art communication device is that since it is difficult to change, during communication in the full duplex mode, the communication in the full duplex into the communication in another mode such as the full singlet (broadcast mode) or half duplex mode, the communication device is inconvenient in that it is difficult to smoothly make communication with all the partners during communication in the full duplex mode.

SUMMARY OF THE INVENTION

It is therefore an object of the present invention to provide a communication system with a group registration function, which is capable of setting a group mode with the reduced number of operating switches, and simply selecting one of the full duplex communication, full singlet communication, and half duplex communication by a rider, as needed.

To achieve the above object, according to a first feature of the present invention, there is provided a communication system with a group registration function, which includes a group mode for selectively registering, among a plurality of communication partners, at least one or more specific partners as each group, and which allows communication only between one group selectively registered and another group selectively registered, characterized in that a plurality of the groups are allowed to be registered, and among the plurality of registered groups, one group to be selected as communication partners is switchable by a single operation. With this feature, since the group to be selected as communication partners can be switched by a single operation, a rider can perform the switching operation even during running of a motorcycle or the like, thereby largely improving the operability.

According to a second feature of the present invention, there is provided a communication system with a group registration function including at least a power supply switch and a first switch for registering a group mode, characterized in that if the first switch is turned on when the power supply switch is turned on, a first group mode is registered, and if the first switch is turned on after the power supply switch is turned on, a second group mode is registered. With this feature, the first group mode can be registered by a single touching operation, that is, by turning on both the power supply switch and the first switch. Further, the second group mode can be registered by two operations, that is, by turning on the power supply switch and then turning on the first switch. As a result, it is possible to set the group mode with the reduced number of operations.

According to a third feature of the present invention, there is provided a communication system with a group registration function, including a second switch for selecting one of communications in the first and second group modes, wherein one of the communications in the first and second group modes is selected in response to the turn-on state or the turn-off state of the second switch. With this feature, it is possible to easily select one of the communication in the first group mode and the communication in the second group mode, and easily switch the former communication to the latter communication.

According to a fourth feature of the present invention, full duplex communication is performed between communication devices registered in the first group mode, and another communication type except for the full duplex communication is performed between communication devices registered in the second group modes. With this feature, it is possible to simply select one of the full duplex communication and another communication, as needed.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION OF THE PREFERRED EMBODIMENTS

Figure 1:
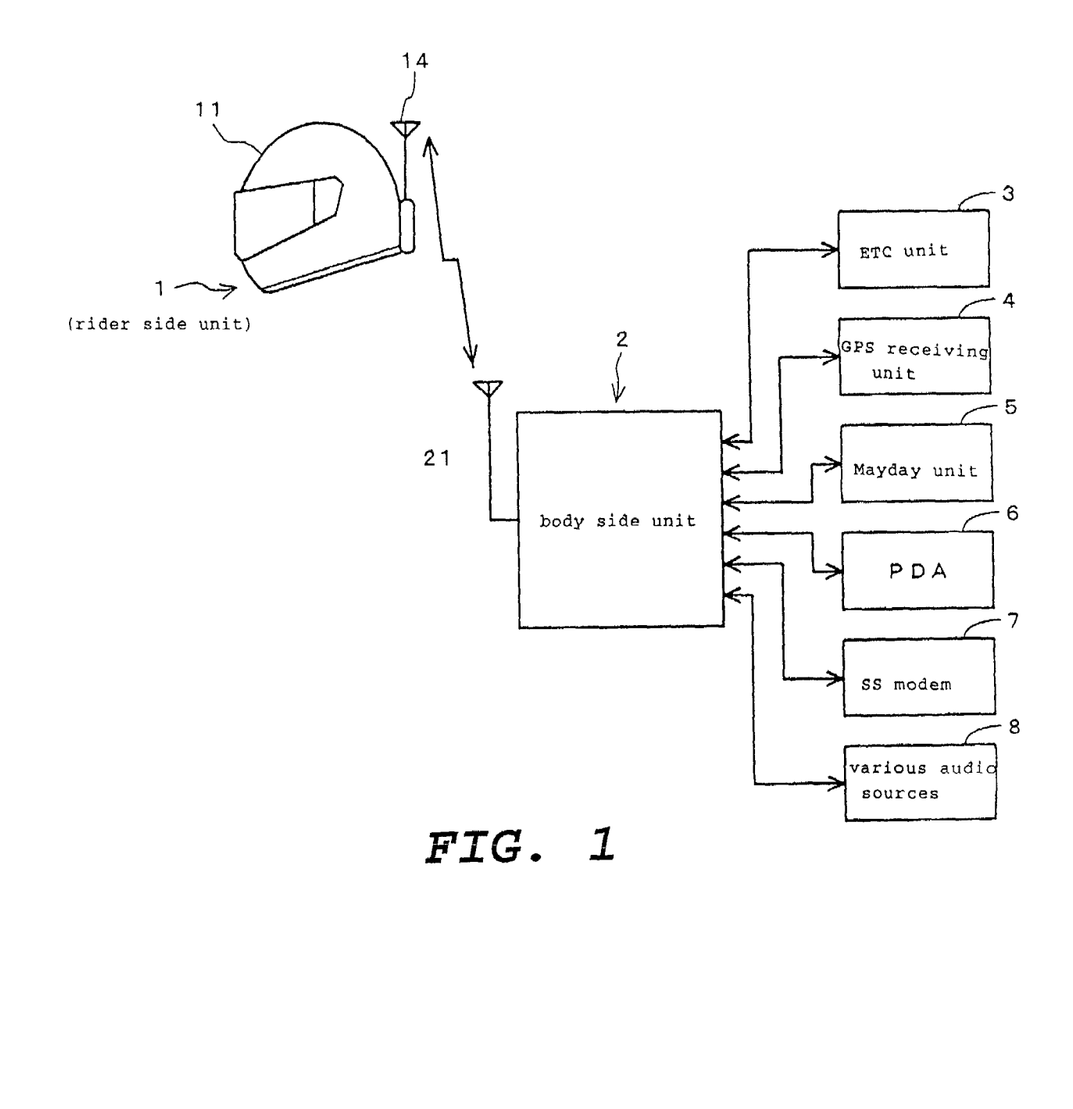
FIG. 1 is a block diagram showing a schematic configuration of one embodiment of the present invention.
Figure 2:
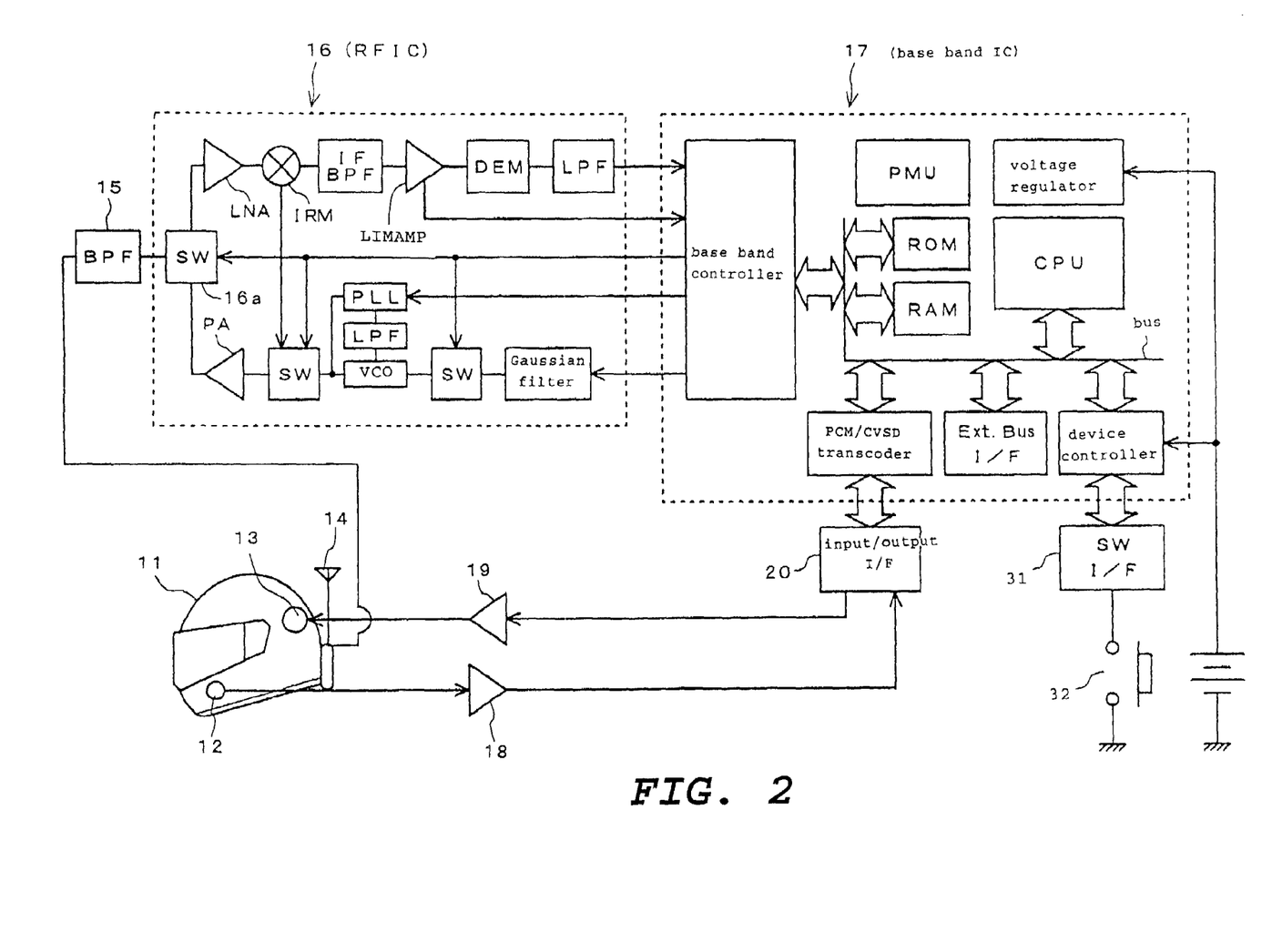
FIG. 2 is a block diagram showing one configuration example of a rider side unit.
Figure 3:
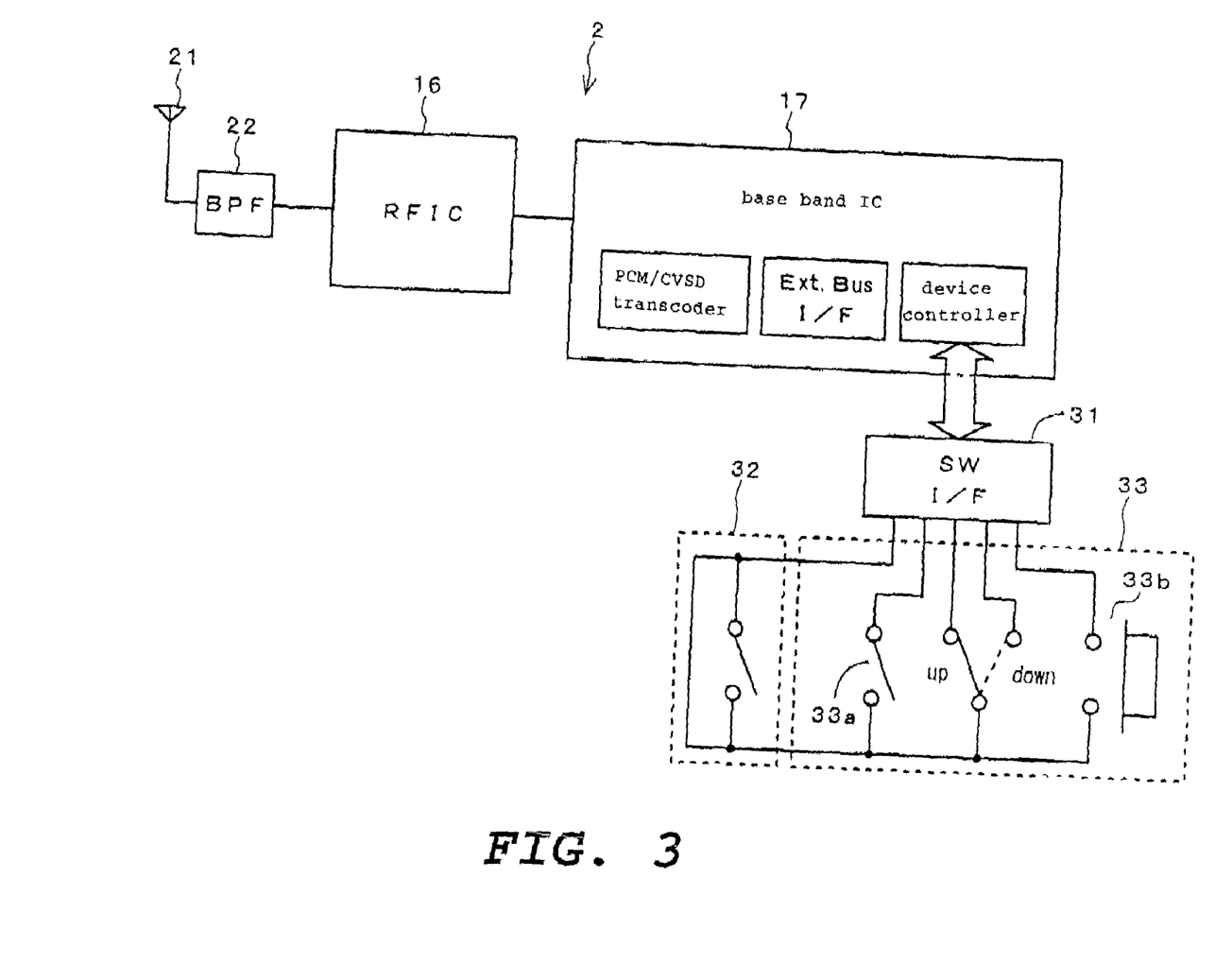
FIG. 3 is a block diagram showing one configuration example of a body side unit.

Hereinafter, the present invention will be described in detail with reference to the drawings. FIGS. 1 to 3 are block diagrams showing schematic hardware configurations of one embodiment of a communication system with a group registration function according to the present invention.

Referring to FIG. 1, each of a rider side unit 1 additionally provided on a helmet put on a rider or the like and a body side unit 2 additionally provided on a vehicular body includes a radio communication device having the known Bluetooth standard. An ETC unit 3 for an automatic rate collection system, a GPS receiving unit 4 for a navigation system, a Mayday unit 5, a personal digital assistant (PDA) 6, an SS modem 7 used for communication with other vehicles or detection of distances from other vehicles, various audio sources 8 for a stereo and the like are connected to the body side unit 2 via wires. The wires may be replaced with radio links utilizing multi-connection function under the Bluetooth standard, as needed.

A configuration example of the rider side unit 1 will be described with reference to FIG. 2. A microphone 12 is disposed at a portion, near the mouth of the rider, of a helmet 11, and a speaker 13 is disposed at a portion, near the right or left ear of the rider, of the helmet 11. A resin case is additionally provided on the rear side of the helmet 11, and an antenna 14 is provided in the resin case. It is to be noted that the microphone 12, speaker 13, and antenna 14 are schematically shown in FIG. 2.

The antenna 14 is connected via a band pass filter 15 to an RF (Radio Frequency) IC 16 functioning as a communication device. The RFIC 16 has a reception side path and a transmission side path, which are changed from each other by means of an antenna SW (switch) 16a. The reception side path (circuit) has a low noise amplifier LNA, a mixer IRM, an IF band pass filter IF BPF, a limit amplifier LIMAMP, a demodulator DEM, and a low pass filter LPF. The transmission side path (circuit) has a Gaussian filter, a switch SW, a PLL circuit, an LPF, a voltage control oscillator VCO, another switch SW, and a power amplifier PA.

A base band IC 17 as a base band signal processing device has a base band controller, a ROM, a RAM, a CPU, a PCM/CVSD transcoder, an external bus I/F, and a device controller, each of which is connected to a bus. The base band IC 17 also has a voltage regulator for stabilizing a power supply voltage, and a power supply control unit PMU.

A voice picked up by the microphone 12 is amplified by a power amplifier 18 and is connected to an input/output I/F 20. On the other hand, a received voice signal supplied from the input/output I/F 20 is amplified by a power amplifier 19 and supplied to the speaker 13, to be reproduced into a voice. A main switch 32 is connected to a I/F switch 31.

The RFIC 16 and the base band IC 17 are known circuits, and therefore, the detailed description of the operation thereof is omitted. In addition, the circuit shown in FIG. 2 is all incorporated in the helmet 11 or in the resin case additionally provided on the helmet 11.

A configuration example of the body side unit 2 according to the present invention will be described with reference to FIG. 3. The body side unit 2 has an antenna 21, a band pass filter BPF 22, and the RFIC 16 and the base band IC 17 each of which has the same configuration as that shown in FIG. 2. The main switch 32 and an at-hand operation SW 33 are connected via the I/F switch 31 to a device controller of the base band IC 17. The at-hand operation switch 33 includes a registration switch 33a used for registration of members and visitors, and a visitor conversation switch 33b. In addition, the ETC unit 3, GPS receiving unit 4, Mayday unit 5, personal digital assistant (PDA) 6, SS modem 7, and various audio sources 8, which are connected to the body side unit 2 as shown in FIG. 1, have no relation with the present invention, and therefore, are not shown in FIG. 3.

Figure 4A:
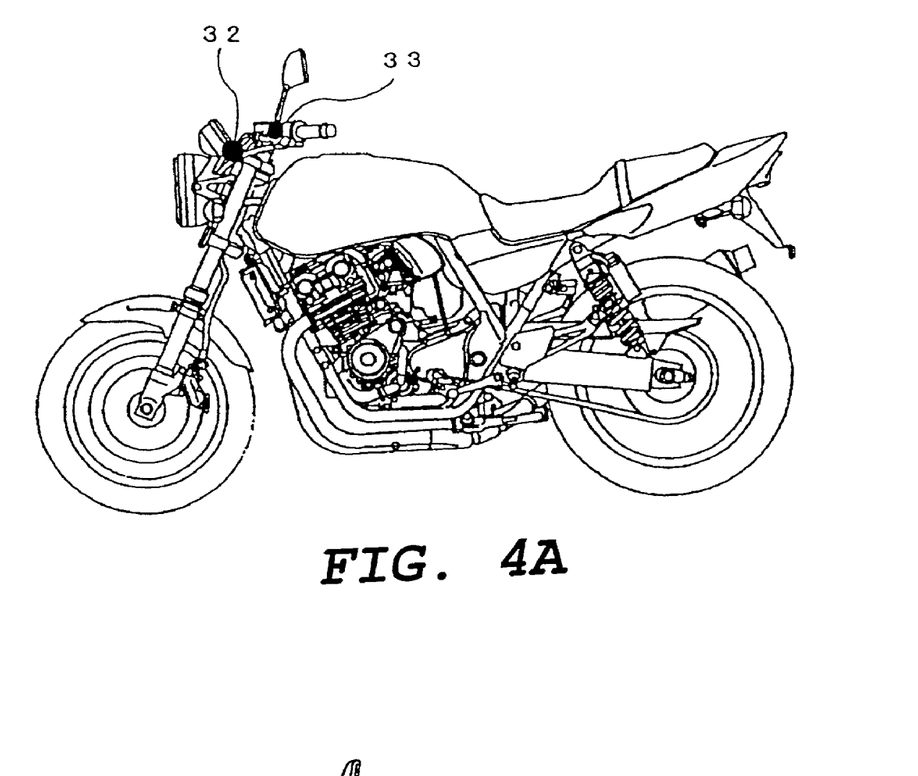
FIGS. 4(a) and 4(b) are conceptional views showing one example of layout of a main switch and an at-hand operation switch on a motorcycle.
Figure 4B:
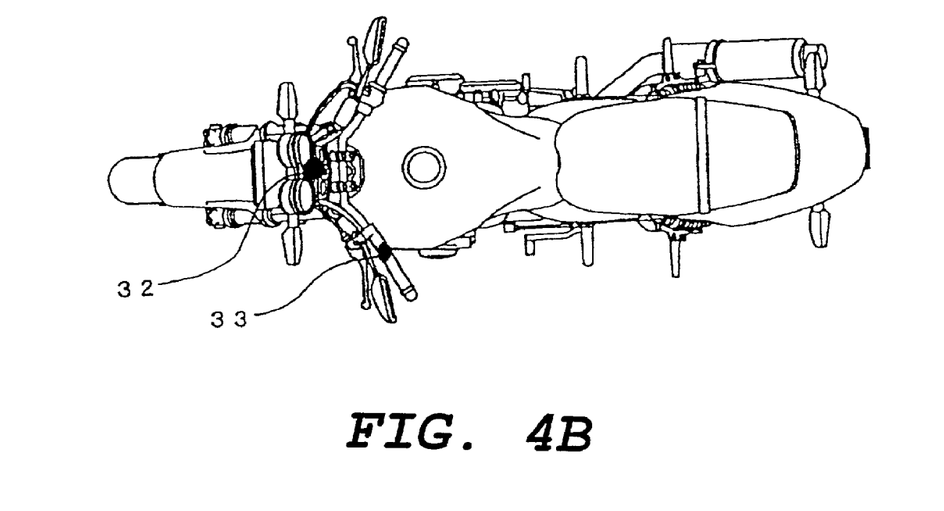

FIGS. 4(a) and 4(b) are conceptional views showing one example of layout of the main switch 32 and the at-hand operation switch 33 on a motorcycle. As is apparent from these figures, the main switch 32 is provided at a central portion of a handlebar, and the at-hand operation SW 33 is provided in the vicinity of a left grip.

Figure 5:
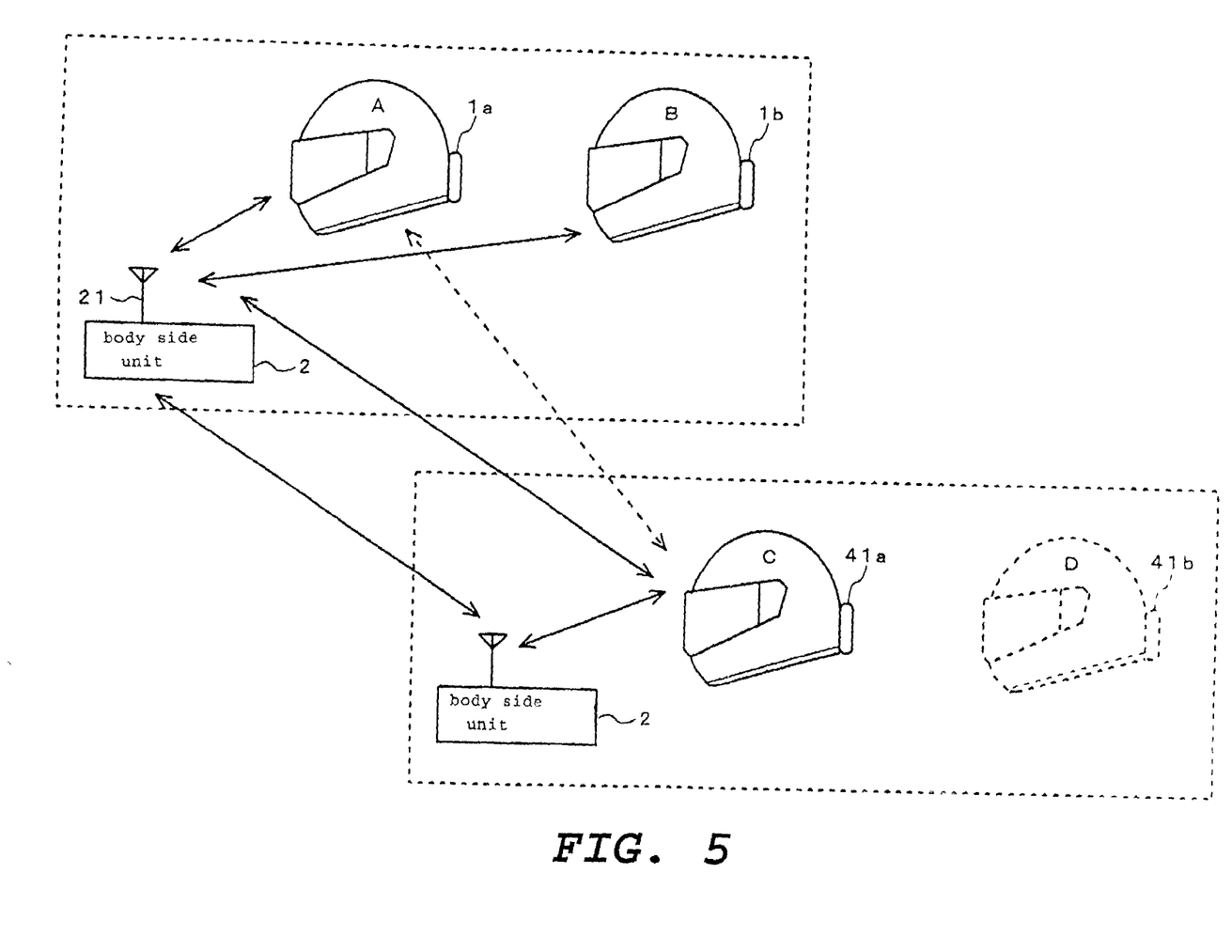
FIG. 5 is a schematic view illustrating a function of a communication system with a group registration function according to the present invention.

A function of a communication system with a group registration function according to the present invention, which is additionally provided on the body side unit, will be described with reference to FIG. 5.

The body side unit 2 can register, for example, rider side units 1a and 1b as members and a rider side unit 41a as a visitor by the function of the registration switch 33a. If the rider side unit 1a registered as the member periodically makes calling as a master and the rider side unit 1b responds to the calling, the rider side unit 1b is taken, from that time, as a slave of the rider side unit 1a.

Full duplex communication is performed between the rider side units registered as a group of members, and half duplex communication is performed between the rider side unit 1a as the master and the rider side unit 41a as the visitor. Accordingly, the rider side unit 1a can make communication (conversation) with the rider side unit 1b as the member without operation of any switch. Also if the rider side unit 1a turns on the visitor conversation switch 33b and continues the turn-on state thereof, it can make communication (conversation) with the rider side unit 41a as the visitor. In other words, a plurality of groups can be registered, and a communication target can be selectively switched from one to another group by a single operation, thereby significantly improving the operability. The transmission/reception switching of half duplex communication between the rider side units 1a and 41a will be described later.

Figure 6:
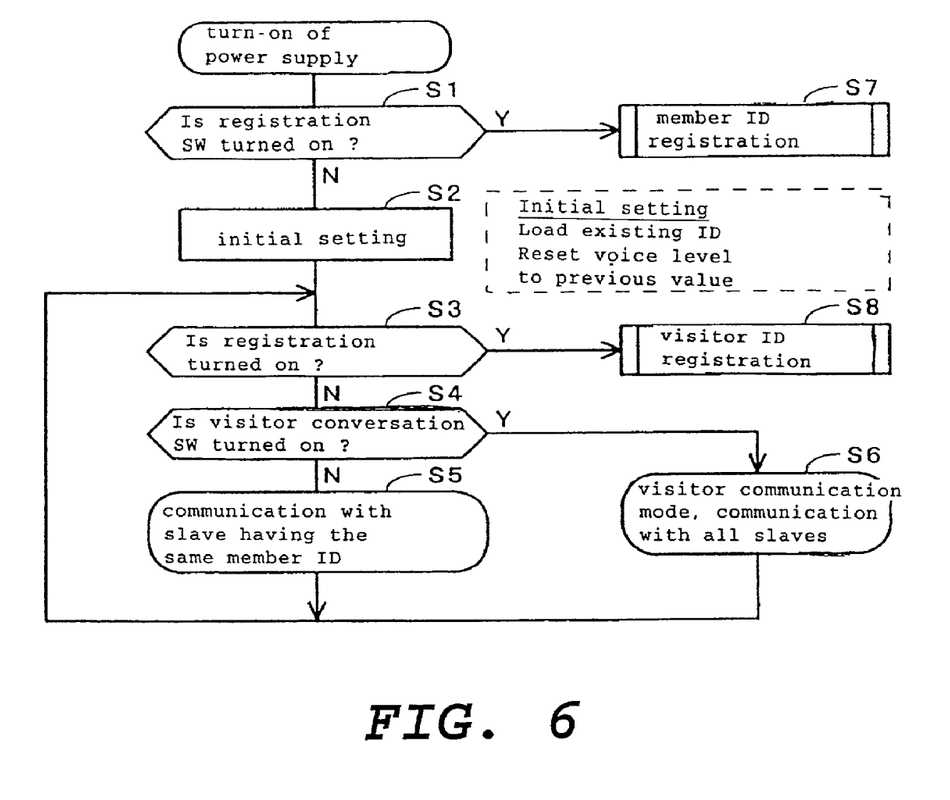
FIG. 6 is a flow chart showing a function of the body side unit according to one embodiment of the present invention.
Figure 7:
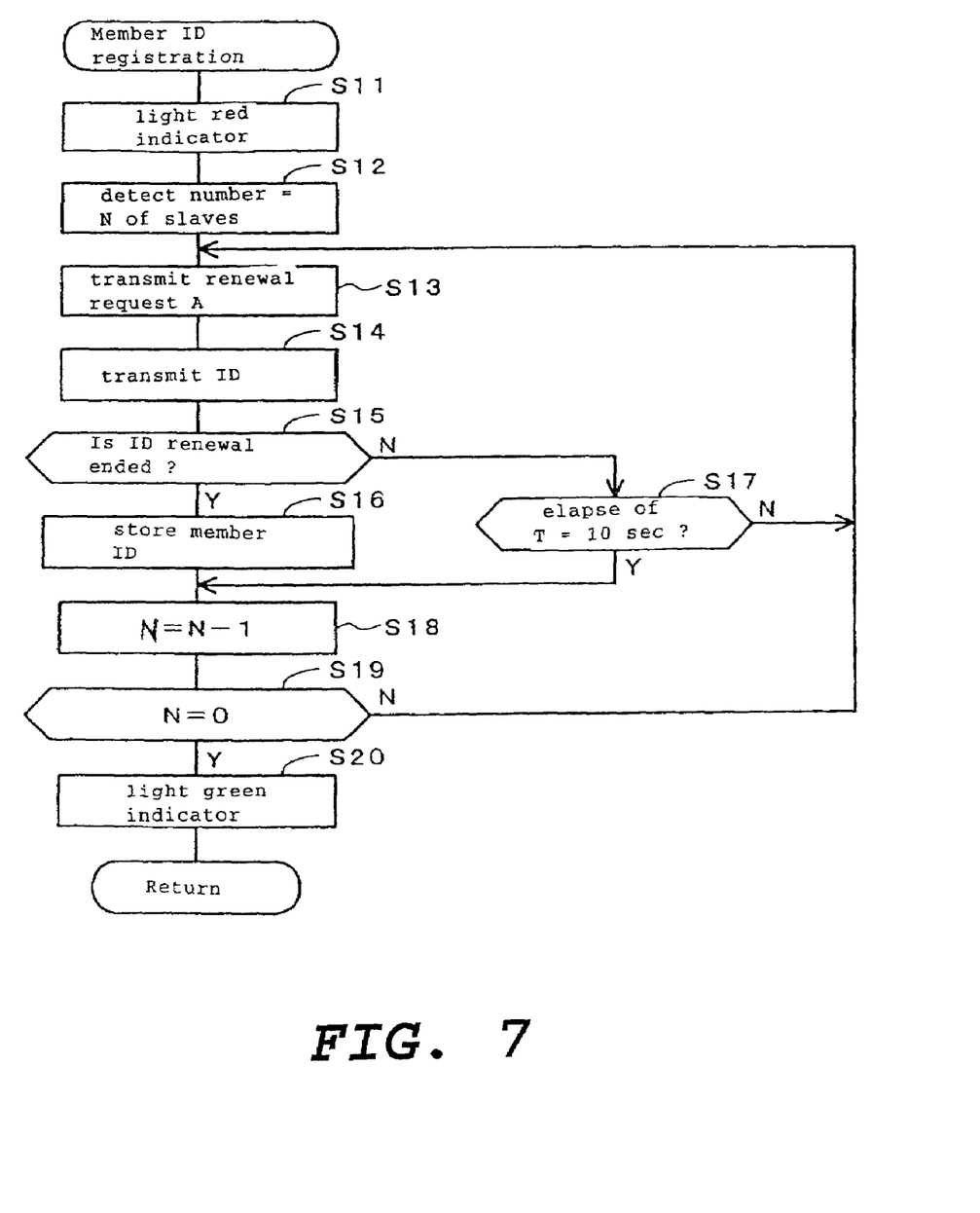
FIG. 7 is a flow chart showing a procedure of member ID registration.

The function of the communication system with a group registration function will be described in more detail with reference to flow charts shown in FIGS. 6 to 8. Referring to FIG. 6, when the main switch 32 of a body side unit 2 shown in FIGS. 3 and 4 is turned on, it is decided whether or not the registration switch 33a is turned on (step S1). That is to say, it is decided whether or not the main switch 32 and the registration switch 33a are simultaneously turned on. If the answer is affirmative (YES), the procedure goes on to step S7, in which member ID registration is executed. The execution of the member ID registration will be described later in detail with reference to FIG. 7.

If the answer in step S1 is negative (NO), that is, if the registration switch 33a is not turned on when the main switch 32 is turned on, the procedure goes on to step S2, in which initial setting is executed. In the initial setting, for example, the existing ID is loaded, or a voice level is reset to the previous value. The procedure goes on to step S3, in which it is decided whether or not the registration switch 33a is turned on. If the answer is affirmative (YES), the procedure goes on to step S8, in which a visitor ID registration is executed. The execution of the visitor ID registration will be described later in detail with reference to FIG. 8.

The execution of the member ID registration will be described with reference to FIG. 7. When the execution of the member ID registration starts, a red indicator provided on the vehicular body is lighted (step S11). In step S12, the number (=N) of slaves is detected. In step S13, a member ID renewal request signal A is transmitted to an N-th slave, and in step S14, a member ID is transmitted to the N-th slave. In step S15, it is decided whether or not the N-th slave has ended the renewal of the member ID. If the answer is negative (NO), the procedure goes on to step S17, in which it is decided whether or not a specific time (for example, 10 sec) has elapsed. If the answer is negative (NO), the procedure is returned to step S13, followed by repeating the processing from the steps S13 to S15. If the answer in step S15 becomes affirmative (YES) during repetition of the processing from steps S13 to S15, the procedure goes on to step S16, in which the body side unit 2 stores the member ID transmitted to the N-th slave. In step S18, the processing of N=N−1 is executed, and in step S19, it is decided whether or not N has become zero (N=0). If the answer is negative (NO), the procedure returns to step S13, in which the member ID renewal request signal A is transmitted to an (N−1)-th slave. In the following procedure, the processing from step S14 to step S18 is repeated, and if the answer in step S19 becomes affirmative (YES), the procedure goes on to step S20, in which a green indicator is lighted. With the above-described processing, the slaves 1 to N are registered as group members.

Figure 8:
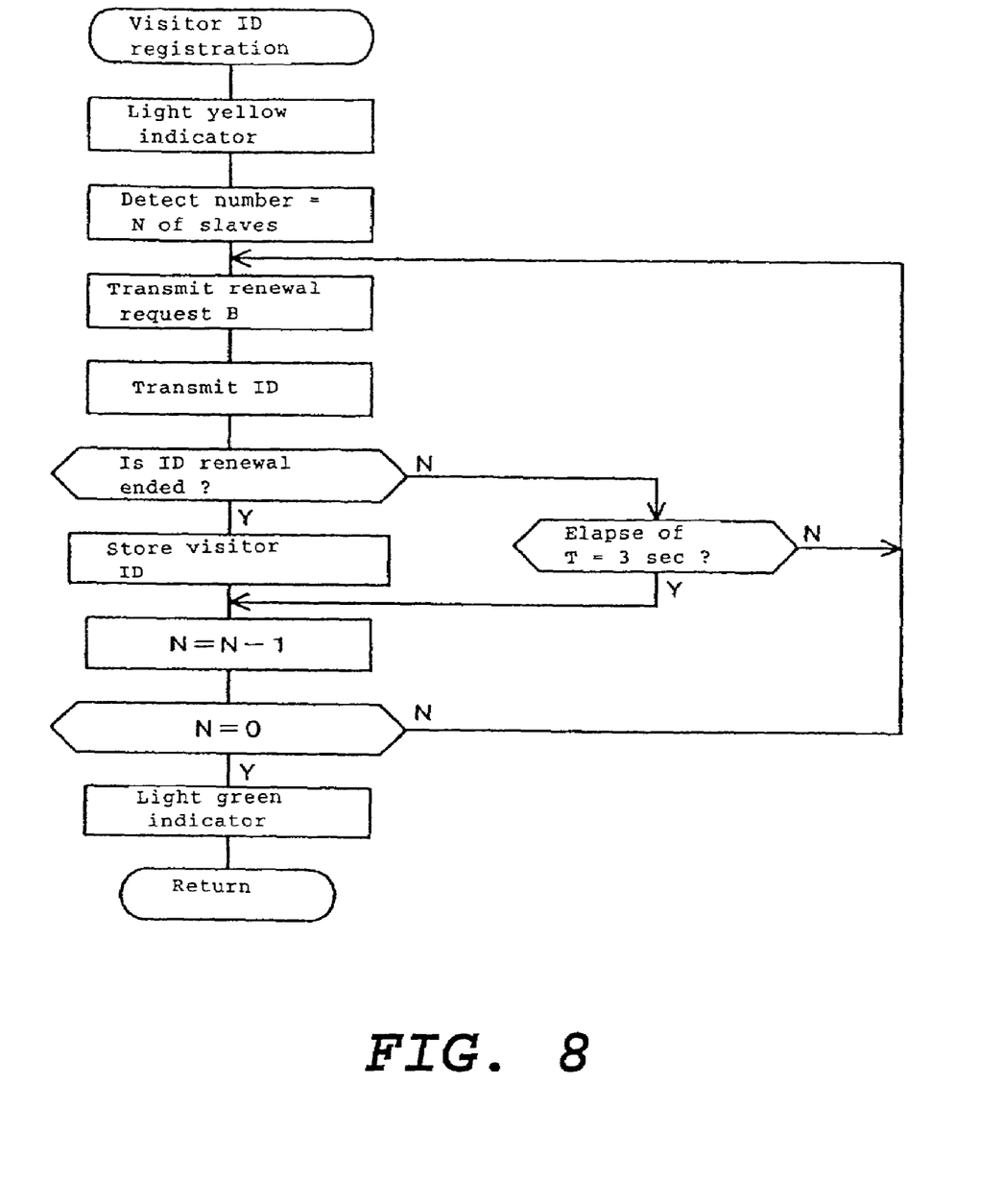
FIG. 8 is a flow chart showing a procedure of a visitor ID registration.

The visitor ID registration is executed in accordance with a procedure shown in FIG. 8. The visitor ID registration is different from the above-described member ID registration only in that the member ID renewal request signal A in step S13 shown in FIG. 7 becomes a visitor ID renewal request signal B shown in FIG. 8. The description of the procedure shown in FIG. 8, therefore, is omitted. In accordance with this procedure shown in FIG. 8, slaves 1 to N are registered as group visitors.

Referring again to FIG. 6, the operation of the body side unit 2 after the member ID registration or the visitor ID registration has been completed will be described. In step S4, it is decided whether or not the visitor conversation switch 33b is turned on. If the answer is negative (NO), the procedure goes on to step S5, in which the body side unit 2 makes communication with the slave having the same member ID. For example, in FIG. 5, if the rider side units 1a and 1b have been subjected to member ID registration, riders A and B on which the rider side units 1a and 1b are put can make communication (conversation) with each other in the full duplex mode via the body side unit 2.

During a period in which the visitor conversation switch 33b is left turned on in step S4 shown in FIG. 6, the procedure goes on to step S6, in which a visitor communication mode is established. In this communication mode, the body side unit 2 makes communication with all of the slaves in the half duplex mode. For example, in FIG. 5, if the rider side unit 41a has been subjected to visitor ID registration, the rider unit 1a can make communication (conversation) with not only the rider side unit 1b but also the rider side unit 41a by way of or not by way of the body side unit 2 in the half duplex mode.

The operation of the rider side unit 1 will be described below with reference to a flow chart shown in FIG. 9. When a power supply is turned on, an initial setting is executed in step S41. With this initial setting, the rider side unit is fixed to a slave; if a member ID is stored, it is loaded; and a voice level is reset to a value immediately before turn-off of the power supply. The procedure goes on to step S42, in which it is decided whether or not there has been calling from a master. If the answer is affirmative (YES), the procedure goes on to step S43, in which it is decided whether or not there has been a member ID or visitor ID renewal request. If the answer is affirmative (YES), the procedure goes on to step S44, in which if the renewal request from the master is the member ID renewal request signal A, the member ID is renewed into a new member ID which is instructed by the master and is transmitted in the above-described step S14.

On the other hand, if the renewal request from the master is the visitor ID renewal request signal B, the visitor ID is renewed into a new visitor ID in the same manner as described above. After the renewal is completed, the procedure goes on to step S45, in which the master is notified of the completion of renewal of the ID, and the procedure is returned to step S42. It is to be noted that if the master is notified of the completion of renewal, the answer in step S15 shown in FIG. 7 or in the step corresponding thereto shown in FIG. 8 becomes affirmative (YES), the procedure goes on to step S16 shown in FIG. 7 or the step corresponding thereto in FIG. 8.

Referring again to FIG. 9, if the answer in step S43 is negative (NO), it is decided whether or not the ID supplied from the master for checking corresponds to the existing ID. If the answer is affirmative (YES), the procedure goes on to step S47, in which communication starts. It is to be noted that the communication is performed as multiplex communication (code division multiplex CDMA or time division multiplex TDMA). After the communication starts, the processing from step S42 to step S46 is repeated, and each time the procedure reaches step S47, the communication is repeated.

Figure 9:
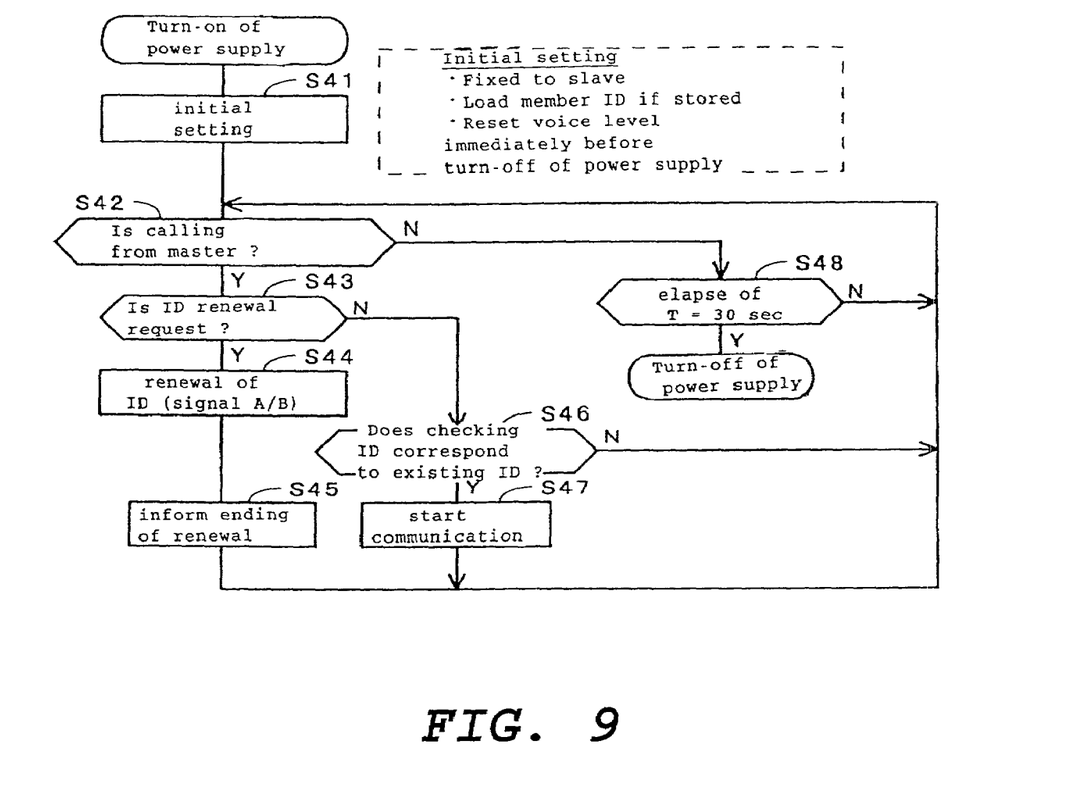
FIG. 9 is a flow chart showing a function of the rider side unit according to one embodiment of the present invention.

If the rider side unit shown in FIG. 9 is each of the rider side units 1a and 1b, the riders A and B are allowed to make full duplex communication with each other by way of the body side unit 2 in step S47. On the other hand, if the rider side unit shown in FIG. 9 is the rider side unit 41a, when the rider A turns on the visitor conversation switch 33b and continues the turn-on state thereof, the rider A is allowed to make half duplex communication with the riders B and C.

If the answer in step S42 shown in FIG. 9 is negative (NO), the procedure goes on to step S48, in which it is decided whether or not a specific time (for example, 30 second or more) has elapsed after the calling from the master has been interrupted. If the answer is affirmative (YES), the power supply is turned off.

As described above, according to this embodiment, if the registration switch 33a is turned on when the main (power supply) switch 32 is turned on, the member ID registration can be automatically executed, and if the registration switch 33a is turned on after the main (power supply) switch 32 is turned on, the visitor ID registration can be automatically executed. As a result, both the member ID registration and the visitor ID registration can be simply realized. Further, by switching the operational state of the visitor conversation switch 33b between the turn-on state and turn-off state, the communication mode can be switched between the half duplex communication with visitors and the full duplex communication with members. As a result, the rider can simply select between the half duplex communication mode and the full duplex communication mode.

The half duplex communication requires a function of switching the transmitting operation to or from the receiving operation. As such a function, a so-called VOX (Voice Action) function capable of interrupting the transmitting operation when there is no voice input from the microphone 12 may be provided in the base band IC of each rider side unit. The VOX function brings the transmission permitting state only in a period in which there is speaking by a rider, and automatically brings the receiving state when there is no speaking by any rider.

To be more specific, if the rider A having the rider side unit 1a phonates in the state in which the visitor conversation switch 33b is turned on, the transmission permitting state is established by the VOX function provided in the base band IC 17. The body side unit 2 receives a signal from the rider side unit 1a in accordance with a specific procedure, adds information on member IDs and visitor IDs to the signal, and re-transmits the signal to the other rider side units. Since the information of the member IDs and the visitor IDs are added to the re-transmitted signal, the rider side units having the same registered IDs as those added to the re-transmitted signal all demodulate a voice supplied from the rider side unit 1a on the basis of the re-transmitted signal. After the voice of the rider A disappears, the transmitting state of the rider side unit 1a is ended, to be thus returned to the receiving state.

Similarly, when the rider C having the rider side unit 41a phonates while depressing the visitor conversation switch 33b of the body side unit 2 associated with the rider C, the body side unit 2 re-transmits a signal, to which member IDs and visitor IDs are added, to the other rider side units, and the riders A and B can receives the signal and listen a voice obtained by demodulation on the basis of the signal. Accordingly, half duplex communication can be performed between the riders A and C.

After the transmission of the signal from the body side unit 2 based on the voice of the rider A is ended, if the rider C having received the signal (voice from the rider A) speaks without depressing the visitor conversation switch 33b of the body side unit 2 associated with the rider C, the body side unit 2 associated with the rider C re-transmits a signal to which visitor IDs are not added but only member IDs are added. In this case, only riders (not shown) having rider side units registered as members in the body side unit 2 associated with the rider C can demodulate a voice of the rider C, and the riders A and B cannot listen a voice, obtained by demodulation on the basis of the signal, of the rider C. Accordingly, the communication of the rider A with the rider C and the riders registered as the members of the rider C becomes full singlet (or broadcast) communication, which does not require any reply from the rider C and the riders registered as the members of the rider C.

All of the IDs of communication devices of motorcycles may be configured to contain a predetermined common code, and partners containing the common code may be all set as visitors in the initial states of the communication devices. In actuality, only by registering as members, at the time of starting touring, rider side units being put on riders as partners in the touring, one of the riders, when he happens to meet with a strange rider having the rider side unit containing the common code, for example, at an intersection, can make conversation with the strange rider only by turning on the visitor conversation switch 33b.

Another embodiment of the operation in the half duplex communication will be described below. This embodiment is the same as the previous embodiment in that when the visitor conversation switch 33b is turned on and then the rider A having the rider side unit 1a speaks, the transmission permitting state is obtained by the VOX function provided in the base band IC 17.

The rider A having the rider side unit 1a and the rider B having the rider side unit 1b are registered as members in the body side unit 2 associated with the rider A. These riders A and B are hereinafter referred to as "a group 1". Similarly, the rider C having the rider side unit 41a and a rider D having a rider side unit 41b are registered as members in the body side unit 2 associated with the rider C. These riders C and D are hereinafter referred to as "a group 2".

When the registration of the relationship between the master and slave between the members in the group 1 is ended, communication using voice links based on the Bluetooth standard is established between the members in the group 1 and the full duplex communication therebetween starts. Similarly, the full duplex communication between the members in the group 2 starts.

In such a state, although visitor registration is established between the groups 1 and 2, communication circuits of the groups 1 and 2 are not connected to each other, and therefore, any conversation is not permitted between the groups 1 and 2. When the rider A depresses the visitor conversation switch 33b of the body side unit 2 associated with the rider A, the body side unit 2 associated with the rider A transmits a calling signal (communication circuit connection request signal) to the body side unit 2 associated with the rider C registered as the visitor by making use of data links based on the Bluetooth standard.

The rider side unit 2 associated with the rider C informs the rider C of the reception of the calling signal (communication circuit connection request signal) by lighting an indicator lamp provided on the body side unit 2 or transmitting an informing signal (sound signal) to the rider side unit 41a associated with the rider C so as to generate sound on the base of the sound signal.

If the rider C having received the informing signal does not depress the visitor conversation switch 33b of the body side unit 2 associated with the rider C, the connection state is left as it is, that is, the communication circuits of the body side unit 2 associated with the rider A is not connected to the communication circuit of the rider side unit 2 associated with the rider C.

If the rider C having received the informing signal depresses the visitor conversation switch 33b of the body side unit 2 associated with the rider C, the communication circuit of the rider side unit 2 associated with the rider A is connected to the communication circuit of the rider side unit 2 associated with the rider C in accordance with the calling signal (communication circuit connection request signal) supplied from the rider side unit 2 associated with the rider A. In this way, conversation is permitted between the groups 1 and 2, that is, between one of the riders A and B in the group 1 and one of the riders C and D in the group 2 in the half duplex communication mode.

In the half duplex communication mode, it may be desirable to provide a function capable of preventing transmitting operation due to simultaneous phonation of two or more riders. As such a function, for example, there is known a so-called carrier sense function. If the rider B previously phonates to start the transmitting operation of the rider side unit 1b associated with the rider B, the carrier sense function can prohibit the transmitting operation of another rider side unit having detected a signal transmitted from the rider side unit 1b until the transmitting operation of the rider side unit 1b is ended.

Like the previous embodiment of the operation of the half duplex communication, all of IDs of communication devices of motorcycles may be configured to contain a predetermined common code, and partners containing the common code be all set as visitors in the initial states of the communication devices. In actual, only by registering as members, at the time of starting touring, rider side units put on riders as partners in the touring, one of the riders, when he happens to meet with a strange rider having the rider side unit containing the common code, for example, at an intersection, can make conversation with the strange rider only by turning on the visitor switch 33b, following by phonation.

As is apparent from the above description, according to the invention, a group to be selected as communication partners is switchable by a single operation, the operability can be largely improved. In particular, in the case of applying the present invention to a motorcycle, it is possible to obtain a significantly large effect.

According to the invention, registration of the first group mode (for example, group members) and registration of the second group mode (for example, group visitors) can be executed by a simple operation. Accordingly, in the case of applying the communication system with a group registration function to a vehicle such as a motorcycle, it is possible to obtain a large usability.

According to the invention, it is possible to easily select one of the communication in the first group mode and the communication in the second group mode, and to easily switch the communication in the first group mode to the communication in the second group mode.

According to the invention, it is possible to easily switch, during communication in the full duplex mode, the communication in the full duplex mode to the communication in the half duplex mode, and to simply select one of the full duplex communication and the half duplex communication, as needed.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A communication system with a group registration function, comprising:
at least a power supply switch and a first switch operable by a user for registering at least a first group mode and a second group mode,
wherein if said first switch and said power supply switch are turned on simultaneously, the first group mode is registered, and if said first switch is turned on after said power supply switch is turned on, the second group mode is registered; and
further comprising a second switch,
wherein after the first and second group modes have been registered, the second switch being adapted to enable switching of communication from the first group mode to the second group mode with a single operation of the second switch.

2. The communication system with a group registration function according to claim 1, wherein full duplex communication is performed among communication devices registered in said first group mode, and another communication type different from said full duplex communication is performed among the communication devices registered in said second group mode.

3. The communication system with a group registration function according to claim 1, further including a second switch for selecting one of a communications in said first group mode and said second group mode,
wherein the one of the communications in said first group mode and said second group mode is selected in response to the turn-on state or the turn-off state of said second switch.

4. The communication system with a group registration function according to claim 3, wherein when said second switch is turned on during the communication in the first group mode, the communication in the first group mode is switched to the communication in the second group mode.

5. The communication system with a group registration function according to claim 3, wherein full duplex communication is performed among communication devices registered in said first group mode, and another communication type different from said full duplex communication is performed among the communication devices registered in said second group mode.

6. The communication system with a group registration function according to claim 1, wherein said first group mode is a group registration mode for members, and said second group mode is a group registration mode for visitors.

7. The communication system with a group registration function according to claim 6, wherein full duplex communication is performed among communication devices registered in said first group mode, and another communication type different from said full duplex communication is performed among the communication devices registered in said second group mode.

8. The communication system with a group registration function according to claim 6, further including a second switch for selecting one of a communications in said first group mode and the second group mode,
wherein the one of the communications in said first group mode and said second group mode is selected in response to the turn-on state or the turn-off state of said second switch.

9. The communication system with a group registration function according to claim 8, wherein when said second switch is turned on during the communication in the first group mode, the communication in the first group mode is switched to the communication in the second group mode.

10. The communication system with a group registration function according to claim 1, wherein said power supply switch and said first switch are additionally provided on a vehicle.

11. The communication system with a group registration function according to claim 10, wherein full duplex communication is performed among communication devices registered in said first group mode, and another communication type different from said full duplex communication is performed among the communication devices registered in said second group mode.

12. The communication system with a group registration function according to claim 10, further including a second switch for selecting one of a communications in said first group mode and said second group mode,
wherein the one of the communications in said first group mode and said second group mode is selected in response to the turn-on state or the turn-off state of said second switch.

13. The communication system with a group registration function according to claim 12, wherein full duplex communication is performed among communication devices registered in said first group mode, and another communication type different from said full duplex communication is performed among the communication devices registered in said second group mode.

14. The communication system with a group registration function according to claim 12, wherein when said second switch is turned on during the communication in the first group mode, the communication in the first group mode is switched to the communication in the second group mode.

15. The communication system with a group registration function according to claim 10, wherein said first group mode is a group registration mode for members, and said second group mode is a group registration mode for visitors.

16. The communication system with a group registration function according to claim 15, further including a second switch for selecting one of a communications in said first group mode and said second group mode,
wherein the one of the communications in said first group mode and said second group mode is selected in response to the turn-on state or the turn-off state of said second switch.

17. The communication system with a group registration function according to claim 16, wherein when said second switch is turned on during the communication in the first group mode, the communication in the first group mode is switched to the communication in the second group mode.

18. The communication system with a group registration function according to claim 2,
wherein the group mode includes a first group mode and a second group mode, and
wherein full duplex communication is performed among the communication devices registered in said first group mode, and another communication type different from said full duplex communication is performed among the communication devices registered in said second group mode.

19. A communication system with a group registration function, comprising:
a plurality of communication devices each including:
a group mode adapted to enable a user to selectively register, among a plurality of communication partners, at least one or more specific communication partners in each of a plurality of groups, the group mode allowing communication only between a first group of the plurality of groups selectively registered and a second group of the plurality of groups selectively registered; and
at least a power supply switch and a first switch operable by a user for registering at least a first group mode and a second group mode,
wherein after the plurality of said groups have been registered, by one of the communication partners in the first group, a single operation of the switch by the user designates the second group as additional communication partners, and
wherein if said first switch and said power supply switch are turned on simultaneously, the first group mode is registered, and if said first switch is turned on after said power supply switch is turned on, the second group mode is registered;
the plurality of communication devices each further including:
a second switch,
wherein after the first and second group modes have been registered, the second switch being adapted to enable switching of communication from the first group to the second group with a single operation of the second switch.

* * * * *